April 27, 1926.

C. C. PECK

ARC WELDING

Filed June 2, 1922

1,582,081

INVENTOR.
Cecil C. Peck.
BY
Fay, Oberlin & Fay
ATTORNEYS

Patented Apr. 27, 1926.

1,582,081

UNITED STATES PATENT OFFICE.

CECIL C. PECK, OF CLEVELAND, OHIO, ASSIGNOR TO THE LINCOLN ELECTRIC COMPANY, OF CLEVELAND, OHIO, A CORPORATION OF OHIO.

ARC WELDING.

Application filed June 2, 1922. Serial No. 565,340.

*To all whom it may concern:*

Be it known that I, CECIL C. PECK, a citizen of the United States, and a resident of Cleveland, county of Cuyahoga, and State of Ohio, have invented a new and useful Improvement in Arc Welding, of which the following is a specification, the principle of the invention being herein explained and the best mode in which I have contemplated applying that principle so as to distinguish it from other inventions.

It has been known for some time that the character and form of an electric arc can be influenced by establishing a magnetic field in its proximity, the lines of force of such field serving to give direction to the arc and even, as in one familiar type of control switch, to "blow" the same out entirely. I have found that strikingly similar results may be obtained, so far at least as control of the form and direction of the arc is concerned, by employing a special construction of positive electrode, no electro-magnetic coil or equivalent means for producing a magnetic field being necessary. With such special form of electrode, the arc may be projected so as to assume much of the character of the flame from a gas blow torch and by suitably dimensioning the apparatus, a portable welding device is provided having all the convenience and flexibility in use that such a gas or oil torch possesses. At the same time I obtain, with approximately the same consumption of electric current, an intensity in heating effect as great, if not greater, than that obtained where the arc is struck directly between an electrode and the work as is done in ordinary commercial arc welding practice.

To the accomplishment of the foregoing and related ends, the invention, then, consists of the means and steps hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:—

Figure 1:
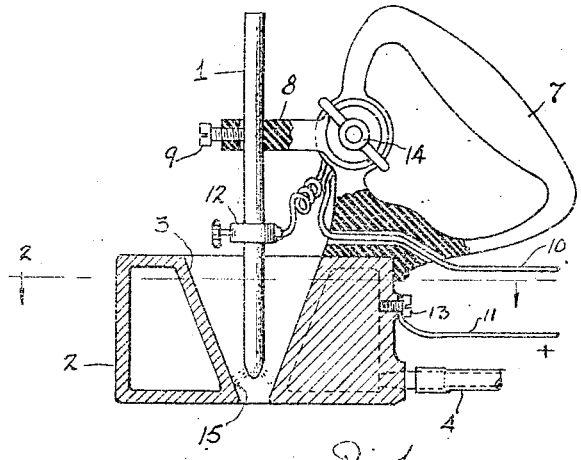
Figure 2:
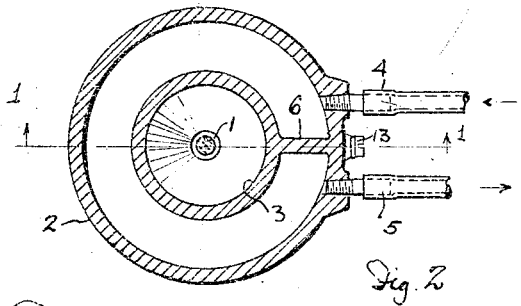
Figure 3:
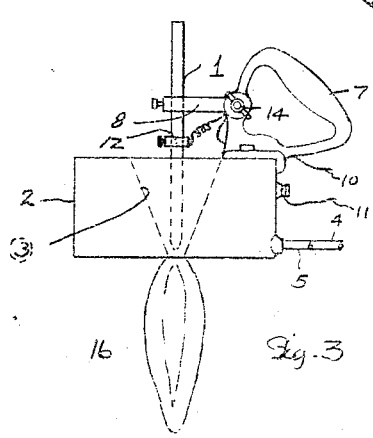

Fig. 1 is a vertical central section through an apparatus, specifically a portable device, for arc welding in accordance with my present improved method; Fig. 2 is a transverse section of such device, the plane of the section being indicated by the line 2—2, Fig. 1; and Fig. 3 is an elevational view of the device, on a somewhat smaller scale and more or less diagrammatic in character.

In carrying out my present improved method or process I employ as the negative electrode a carbon rod or pencil 1 as usual in arc welding where the arc is struck directly between such electrode and the work. As previously indicated, however, I employ a special positive electrode, the necessity for passing the welding current through the work being entirely done away with. Such positive electrode, as best shown in Figs. 1 and 2, takes the form of a hollow ring or annulus 2 which is preferably made of copper or other metal that is a good conductor of electricity and capable of withstanding the temperatures to which it is subjected, the maximum temperature not being particularly high, as will be presently made clear. The inner opening 3 in such annulus or ring 2 is preferably of flaring form in central, axial section, as shown in Fig. 1, and of circular form in cross-section, as shown in Fig. 2. Means are provided for circulating a cooling fluid, such as water for example, through the hollow interior of the annulus, such means being shown as comprising simply a water intake duct 4 and an outlet duct 5 that are preferably located at closely adjacent points on one side of the ring, a partition 6 in the hollow interior lying between the openings of such ducts and serving thus to cause the cooling fluid to circulate entirely around the electrode.

Where the apparatus is intended to be portable, a handle 7, suitably insulated, is provided on the ring or annular hollow electrode 2, said handle being preferably located on the same side of the ring as the water connections 4 and 5 and being inclined at an angle to the axis of the ring. An apertured arm 8, projecting from such handle and provided with a set screw 9, provides means for holding the carbon electrode 1 in properly centered position within the annular electrode 2 and at the same time permits longitudinal adjustment of such electrode. Electrical conductors 10 and 11 are attached to the electrodes 1 and 2, respectively, by means of an adjustable clamp ring 12 on such first electrode and a suitable binding post 13 on the second. A switch 14 is interposed in conductor 10, being preferably mounted alongside of handle 7 where it can be conveniently turned on and off by the operator with one hand while holding such handle with the other.

In operation, the electrode 1 is set with its lower end a short distance back of the lower or smaller end of the flaring or conical opening 3 in annular electrode 2. When a suitable current is supplied, an arc 15 will be formed between such lower end of electrode 1 and the adjacent wall of electrode 2, such arc being circular and more or less conical in shape and inclining at an angle the reverse of that of the wall which defines the opening 3 in said electrode 2. At the same time such arc, or the heated gasses produced thereby, is projected through the smaller end of the opening in question, giving much the effect of a flame 16, as shown in Fig. 3. The core or central portion of this flame is lighter in color than the surrounding portion or envelope and the temperature is highest nearest the base, decreasing gradually towards the tip of the flame. Such highest temperature is, if anything, greater than that obtained where the arc is struck directly between one electrode and the work and a graduated heating effect can be secured by simply moving the apparatus further away from the work since, as just indicated, the temperature of the flame decreases towards the tip. The current employed may be varied to secure different results just as in ordinary arc welding practice, it having been found that satisfactory results are secured using a current of 100 amperes at 50 volts.

As the carbon electrode is brought down towards the smaller end of opening 3 in electrode 2, the hissing sound produced by the arc measurably increases and the length of the flame is reduced. Preferably the electrode 1 is retracted until such hissing is minimized and a flame of proper length and form for the work in hand secured.

It will be understood, of course, that the apparatus for carrying on my improved method or process instead of being portable may be incorporated in a suitable machine wherein the two electrodes are mechanically advanced along the work as is the single electrode, whether of carbon or metal, in famaliar types of commercial arc welding apparatus.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. In arc-welding mechanism, the combination of an electrode of relatively high electrical conductivity in the form of an annulus, and an electrode of relatively high electrical resistance in the form of a rod disposed with one end in the opening of said first electrode, such opening being of symmetrical form in axial cross section, whereby a circular arc is formed between such end of the second electrode and the inner wall of the first.

2. In arc-welding mechanism, the combination of an electrode of relatively high electrical conductivity in the form of an annulus, means for cooling said electrode, and an electrode of relatively high electrical resistance in the form of a rod disposed with one end in the opening of said first electrode, such opening being of symmetrical form in axial cross section, whereby a circular arc is formed between such end of the second electrode and the inner wall of the first.

3. In arc-welding, mechanism the combination of an electrode of relatively high electrical conductivity in the form of an annulus, the opening in said electrode being of symmetrical, inwardly flaring form in axial cross section, and an electrode of relatively high electrical resistance in the form of a rod projecting co-axially within said first electrode and terminating adjacent the smaller end of the opening therein, whereby a circular arc is formed between such end of the second electrode and the inner wall of the first.

4. In arc-welding mechanism, the combination of an electrode of relatively high electrical conductivity in the form of an annulus, the opening in said electrode being of symmetrical, inwardly flaring form in axial cross section, and an electrode of relatively high electrical resistance in the form of a rod projecting co-axially within said first electrode and terminating adjacent the smaller end of the opening therein, a freely open space being left between such end of the second electrode and the inner wall of the first, whereby a circular arc is formed, substantially as described.

5. In arc-welding mechanism, the combination of a metallic electrode in the form of an annulus, and a carbon electrode disposed with one end in the opening of said metal electrode but spaced therefrom, such opening being of symmetrical form in axial cross section, whereby a circular arc is formed between such end of the carbon electrode and the inner wall of the metal electrode.

6. In arc-welding mechanism, the combination of a metallic electrode in the form of an annulus, and a carbon electrode disposed with one end in the opening of said metal electrode but spaced therefrom, such opening being of symmetrical, inwardly flaring form in axial cross section, whereby a circular arc is formed between such end of the carbon electrode and the inner wall of the metal electrode.

7. In arc-welding mechanism, the combination of an electrode of copper in the form of a hollow annulus, means for circulating a cooling medium through said electrode, and an electrode in the form of a carbon pencil disposed with one end in the opening of said first electrode, such opening being of symmetrical form in axial cross section, whereby a circular arc is formed between such end of the second electrode and the inner wall of the first.

8. In arc-welding mechanism, the combination of an electrode of copper in the form of a hollow annulus, the opening in said electrode being of flaring form, means for circulating a cooling medium through said electrode, an electrode in the form of a carbon pencil, means adapted to support the latter in longitudinally adjustable position co-axially with said first electrode with its end adjacent the smaller end of the opening therein, such opening being of symmetrical, inwardly flaring form in axial cross section, whereby a circular arc is formed between such end of the second electrode and the inner wall of the first.

9. In arc-welding mechanism, the combination of an electrode of high electrical conductivity, and an electrode of relatively high electrical resistance in the form of a rod disposed with one end adjacent a wall of said first electrode, such wall being inclined with respect to the axis of said second electrode.

10. In arc-welding mechanism, the combination of a metallic electrode, and an electrode in the form of a carbon pencil disposed with one end adjacent a wall of said first electrode, such wall being inclined with respect to the axis of said second electrode.

Signed by me this 29th day of May, 1922.

CECIL C. PECK.